US006587795B2

(12) United States Patent
Schmid

(10) Patent No.: US 6,587,795 B2
(45) Date of Patent: Jul. 1, 2003

(54) METHOD FOR THE OVERLOAD PROTECTION OF A MOBILE CRANE

(75) Inventor: Josef Kaspar Schmid, Hohenems (AT)

(73) Assignee: Liebherr-Werk Nenzing GmbH, Nenzing (AT)

( * ) Notice: Subject to any disclaimer, the term of this patent is extended or adjusted under 35 U.S.C. 154(b) by 0 days.

(21) Appl. No.: 09/854,045

(22) Filed: May 11, 2001

(65) Prior Publication Data

US 2002/0013666 A1 Jan. 31, 2002

(30) Foreign Application Priority Data

May 12, 2000 (DE) ........................................ 100 23 418

(51) Int. Cl.[7] .................................................. G01L 1/00
(52) U.S. Cl. .......................................... 702/42; 212/278
(58) Field of Search ........................... 702/42; 212/278; 250/202; 235/61 A

(56) References Cited

U.S. PATENT DOCUMENTS 3,819,922 A * 6/1974 Horn et al. ................. 212/278
3,866,199 A * 2/1975 Eberhard et al. ........... 250/202
3,889,524 A * 6/1975 Glushko et al. .......... 235/61 A

FOREIGN PATENT DOCUMENTS

| | | |
|---|---|---|
| DD | 276080 | 2/1990 |
| DE | 3420596 | 12/1985 |
| DE | 19538264 | 4/1997 |
| DE | 19653579 | 6/1998 |

* cited by examiner

*Primary Examiner*—Bryan Bui
*Assistant Examiner*—Xiuqin Sun
(74) *Attorney, Agent, or Firm*—Dilworth & Barrese LLP.

(57) ABSTRACT

The invention relates to a method for the overload protection of a mobile crane, in particular of a crawler-mounted crane, in which component-related geometrical data are stored in a memory. In accordance with a selected set-up, the geometrical data are put together to form a physical simulation model on a simulation computer. Taking into account real measurement data, the required geometrical data, centre of gravity data and forces are calculated, and from these the cut-off values. The crane is switched off when these cut-off values are reached.

20 Claims, 1 Drawing Sheet

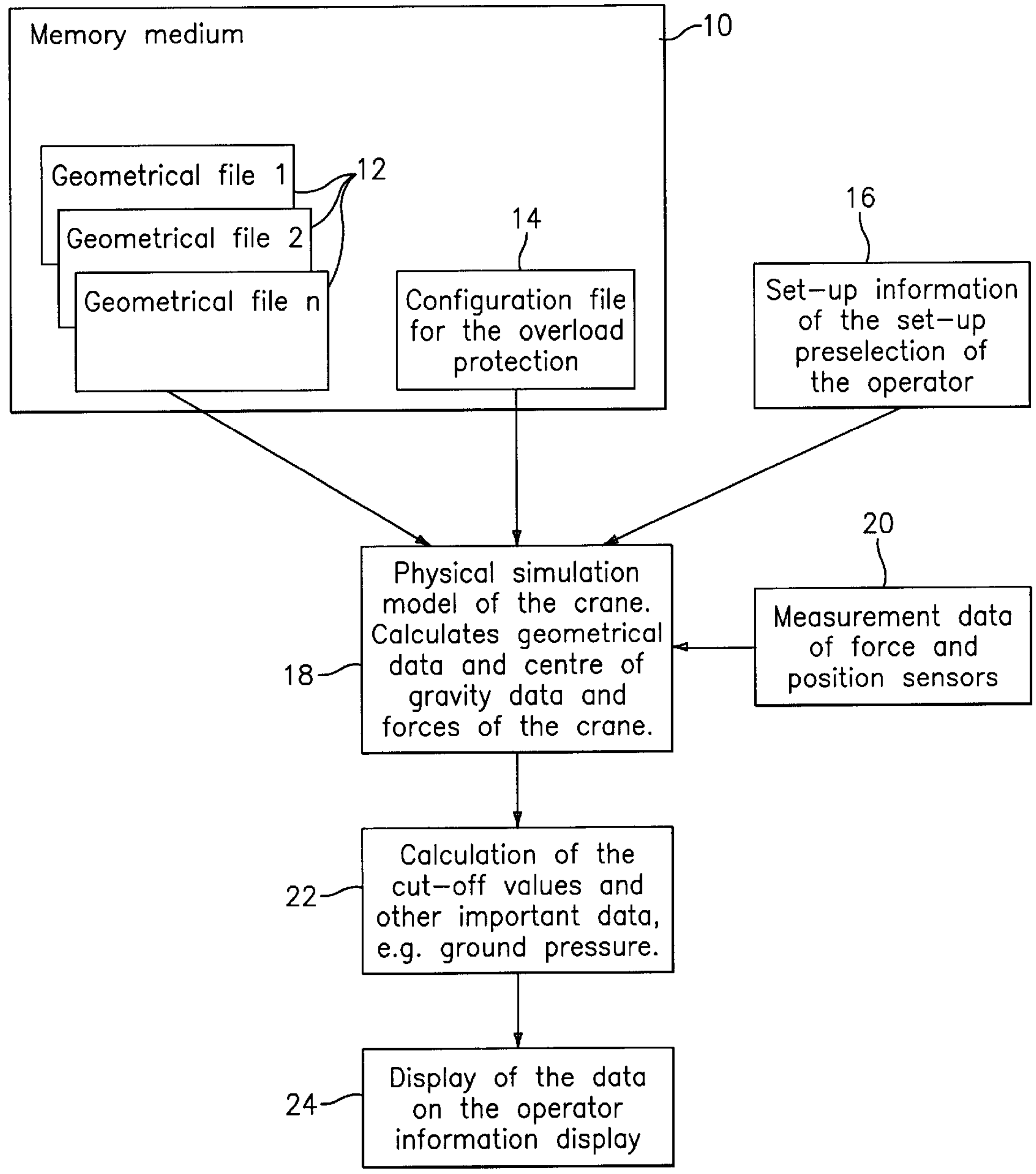
*Figure*

METHOD FOR THE OVERLOAD PROTECTION OF A MOBILE CRANE

BACKGROUND OF THE INVENTION

The invention relates to a method for the overload protection of a mobile crane. Legal provisions require overload protection for all mobile cranes. In accordance with the standard EN 13000, which applies to the European Community, an overload protection is required for mobile cranes, for example, whose lifting capacity is greater than 1,000 kilograms or whose load moment is greater than 40,000 Nm. Mobile cranes are, for example, port mobile cranes, crawler-mounted cranes, etc.

It is already known to pre-calculate the cut-off curves required for the overload protection for all possible set-ups of the respective mobile crane and to store them in the memory of the overload protection. The cut-off curves are represented by a number of points which were calculated. Interpolation is carried out between these points in operation.

Since the stored curves require a lot of memory, interpolation is also frequently made between different load curves to save memory. The curve created in this way, however, no longer corresponds exactly to the results which would be received in a calculation with the calculation methods prescribed by the regulations. If the crane is now operated so that the appropriate values are exceeded in comparison with the cut-off curves calculated in accordance with the standard, this results in a relative loss of safety. If the real cut-off curves are not reached in this interpolation, the mobile crane is, however, not used to the optimum.

Mostly pre-calculated geometrical data are stored for each set-up for the calculation and display of load radius and, for example, crane height. A complete boom is here described, for example, in simplified manner by a vector. The current radius and other important information for the operator are then calculated by means of these data stored for the complete set-up by means of trigonometry and the data of position sensors. It was hoped that as few calculations as possible would have to be carried out using the method management.

If a mobile crane has only a few different set-ups, the known method, which makes use of the stored curves, can be used with comparatively few problems. It is though disadvantageous here that the behaviour of the crane (notably: inherent weight of the boom) must be adjusted in each case for each crane at the test rig of the mobile crane manufacturer since the component weights as a rule are not available in the accuracy required for the calculation of the overload protection.

Particularly with crawler-mounted cranes, unlike with other kinds of crane, the necessity exists to keep available a very high number of possible set-ups. With large cranes, several tens of thousands of set-ups can alternatively be reached. With the Liebherr crawler-mounted crane LR 1250, more than 20,000 set-ups result. It can be seen from this plurality of different combination possibilities that the memory for the load curves will be relatively large in the crane and under certain circumstances must be doubled when one single new set-up criterion is added.

To solve this problem, some manufacturers have introduced restrictions to the combination possibility of the crane components. This results in an unwanted reduced flexibility of the crane.

If a component is changed in the equipment of the crane, then the disadvantage exists in the known method that all load curves have to be recalculated which results in a new calculation of frequently several weeks. The same applies to the case that the crane operator required a set-up which was originally not provided. Problems also result in the conventional calculation methods in the development of mobile cranes, i.e. in the building of prototypes in which the component weights are not yet known so precisely in detail.

SUMMARY OF THE INVENTION

It is now the underlying object of the invention to provide a method for the overload protection of a mobile crane, in particular of a crawler-mounted crane, with which the respectively current cut-off values can be determined fast and precisely even with a plurality of possible set-ups.

This object is solved in accordance with the invention by a method for the overload protection of a mobile crane in accordance with

- storage of component-related geometrical date in a memory (10);
- selection of the desired set-up in a selection apparatus (16);
- compilation of a physical stimulation model from the selected data in a control computer (18);
- entry of real measurement data from force and position sensors (20) on the crane side;
- calculation of first the geometrical data, center of gravity date and forces and subsequently the cut-off values; and
- optionally, cut-off of the crane when the cut-off values are reached.

Unlike the prior art, overturning load curves are no longer stored in the memory associated with the control computer of the crane, but rather geometrical data with the physical properties of the components of the crane. With an appropriate selection of the desired set-up in a selection apparatus, the corresponding geometrical data, which correspond to the set-up, are then put together in a physical simulation model in the control computer. Now, the real measurement data from the force and position sensors on the crane side are determined and the geometrical data, the centre of gravity data and centre of gravity forces and subsequently the cut-off values are determined from these on the control computer. In the operation of the crane, this is then switched off as appropriate when a cut-off value is reached.

Preferred embodiments of the invention can be seen from the dependent claims following on from the main claim.

For instance, in a first preferred embodiment, the component-related geometrical data for each component type of the crane components are stored in associated geometrical files in the memory. Thus, no longer a complete boom is recorded, but the data of the boom sections and of the other component types are stored in geometrical files respectively associated with them. Here, one geometrical file each is required per component type. The instructions are stored in parallel in a corresponding crane configuration file according to which the crane components can be combined with one another. The different combination possibilities of the individual component types are recorded to form complete booms or set-up parts here.

In accordance with another preferred embodiment of the invention, a pre-selection possibility for the calculation of the cut-off values is also entered in the crane configuration file. The pre-selection possibilities in question are, for example, a calculation provision for permissible lifting loads in accordance with national law. For instance, the permissible lifting loads in the USA differ, for example, from those in Europe (in accordance with the standard EN 13000). On the basis of the method in accordance with the invention and the storage of the corresponding calculation provision, the result can be put together in modular form by accessing the respective data stored in the memory. According to the prior art, one was still forced to calculate a new, complete set of lifting load curves and to store it in the corresponding mobile crane for every different calculation provision, i.e. for example for every different legal order.

The values calculated in the control computer are advantageously reproduced in a display of a display apparatus. In the present method, not only the permissible lifting load and the corresponding limit curve can be displayed in this display apparatus, but simultaneously, more or less as a "waste product" of the simulation model, the actual load, the radius, the crane height, etc.

Another advantageous embodiment of the invention consists of the set-up information being reproduced in the selection apparatus on a display apparatus for the operator. He can therefore put together the crane with the set-up as it is also put together in reality on the screen.

BRIEF DESCRIPTION OF THE DRAWING

Further details and advantages of the invention are explained in more detail by way of an embodiment represented in a drawing. The only FIGURE shows a block diagram of an embodiment of the overload protection in accordance with the invention.

DESCRIPTION OF THE PREFERRED EMBODIMENTS

The geometrical data are stored in the memory 10 in the geometrical files 12 for each component type of the crane, i.e. in particular the component type of the set-up of the crane. On the one hand, the instructions on how the crane components can be combined with one another are stored in the configuration file 14. The configuration file 14 in the embodiment shown here also contains pre-selection possibilities which affect the calculation of the cut-off values. For instance, the calculation provision for permissible lifting loads can be entered alternatively here for the USA and Europe. When the corresponding crane is delivered to the US, then only the corresponding calculation provision has to be activated in the later calculation.

In a selection apparatus 16, the desired set-ups are then compiled by the operator. A screen, not shown in detail here, serves this purpose on which the crane operator can put together the crane as it would correspond to reality using a corresponding manipulation device which is also not shown.

After the end of the entry of the set-up information, a simulation model of the crane is built up in the memory of the control computer in the control computer 18 using the physical values made available from the geometrical data 12 and taking into account the values of the configuration file 14. The simulation model is then calculated online, i.e. in real time, via the sensors of the crane 20, for example angle sensors or force sensors, such that it agrees with the current physical reality of the crane. As a result, all coordinates and forces, and in particular the centre of gravity positions, of the components are calculated. At the same time, the actual load, radius, crane height, etc. of the crane are also calculated and output. As shown at 22, the cut-off values of the overload protection are furthermore calculated from the calculated data in accordance with which the crane is controlled in an otherwise known manner. This means that the crane is automatically switched off when a critical value, i.e. a cut-off value, is reached. At the same time, however, other important data, such as the current ground pressure, can also be calculated; it can also be detected whether a critical strength value of one of the components used would be exceeded by a specifically accepted load or a temporarily occurring load moment. When such a value is exceeded, the crane can automatically be moved back to a safe position by a correspondingly provided control.

Overall, the application possibilities of the mobile crane are substantially improved and interpolated values are no longer used in the calculation of the overturning load. The currently calculated cut-off value corresponds at any time to the methods determined in the provisions. At the same time, the effort for a change in the crane set-up falls considerably since in most cases only the geometrical properties or the weight of the crane components change. This means that in accordance with the method in accordance with the invention only one geometrical file has to be replaced and all set-up configurations of the crane, in which the changed component is to be used, are immediately correctly recalculated. Furthermore, due to the method management in accordance with the invention, same components which are used in different crane types, can be described only once in the configuration file. These data can then also be taken over to another crane type. This takes place frequently with crawler-mounted cranes.

What is claimed is:

1. A method for the overload protection of a mobile crane, comprising the following steps:

storing component-related geometrical data in a memory (10);

selecting desired set-up in a selection apparatus (16);

compiling a physical simulation model from the selected data in a control computer (18);

entering real measurement data from force and position sensors (20) on a crane side;

calculating first geometrical data, center of gravity data and forces, and subsequently cut-off values; and optionally, cutting-off the crane when the cut-off values are reached.

2. A method in accordance with claim 1, wherein the component-related geometrical data for each component type of the crane components are stored in associated geometrical files (12) in the memory (10) and wherein the instructions on the manner of the combination of the individual crane components with one another are stored in a crane configuration file (14).

3. A method in accordance with claim 2, wherein pre-selection possibilities for the calculation of the cut-off values are entered in the crane configuration file (14).

4. A method in accordance with claim 3, wherein the values calculated in the control computer (18) are reproduced in a display of a display apparatus (24).

5. A method in accordance with claim 4, wherein the set-up information is reproduced in the selection apparatus (16) on a display apparatus.

6. A method in accordance with claim 3, wherein the set-up information is reproduced in the selection apparatus (16) on a display apparatus.

7. A method in accordance with claim 3, wherein the pre-selection possibilities include calculation provisions for permissible lifting loads according to various jurisdictions, and comprising the additional steps of:

storing the corresponding calculation provision, and putting the result together in modular form by accessing the respective data stored in the memory (10).

8. A method in accordance with claim 2, wherein the values calculated in the control computer (18) are reproduced in a display of a display apparatus (24).

9. A method in accordance with claim 8, wherein the set-up information is reproduced in the selection apparatus (16) on a display apparatus.

10. A method in accordance with claim 2, wherein the set-up information is reproduced in the selection apparatus (16) on a display apparatus.

11. A method in accordance with claim 2, comprising the additional steps of:

no longer recording a complete boom, storing data for sections of the boom and other component types in the geometrical files (12) respectively associated with the same, providing one geometrical file (12) per component type, storing the instructions in parallel in the corresponding crane configuration file (14) according to which the crane components can be combined with one another, and recording different combination possibilities of the individual component types to form complete booms or set-up parts thereof.

12. A method in accordance with claim 1, wherein the values calculated in the control computer (18) are reproduced in a display of a display apparatus (24).

13. A method in accordance with claim 12, wherein the set-up information is reproduced in the selection apparatus (16) on a display apparatus.

14. A method in accordance with claim 1, wherein the set-up information is reproduced in the selection apparatus (16) on a display apparatus.

15. A method in accordance with claim 1, comprising the additional step of:

no longer storing overturning load curves in the memory (10) associated with the control computer (18) of the crane.

16. The method of claim 1, comprising the additional steps of:

calculating the simulation model online, i.e., in real time, to agree with current physical reality of the crane, calculating and outputting at least one of actual load, radius, and height of the crane at the same time all coordinates and forces and center of gravity positions of the components are calculated, automatically switching off the crane when a critical value such as the cut-off value, is reached, also calculating other data such as current ground pressure, detecting whether a critical strength value of one of the components would be exceeded by a specifically accepted load or a temporarily occurring load moment, and automatically moving the crane back to a safe position when such a value is exceeded.

17. A method in accordance with claim 1, comprising the additional step of:

no longer using interpolated values in calculating the overturning load.

18. A method in accordance with claim 17, comprising the additional steps of:

when a component is to be changed, replacing only one geometrical file (12) and immediately recalculating all set-up configurations of the crane in which the changed component is to be used.

19. A method in accordance with claim 1, comprising the additional steps of:

when a component is changed, replacing only one geometrical file (12) and immediately recalculating all set-up configurations of the crane in which the changed component is to be used.

20. The method in accordance with claim 1, comprising the additional step of:

protecting the overload of a crawler-mounted crane.

* * * * *